United States Patent [19]
Kurita et al.

[11] 4,037,890
[45] July 26, 1977

[54] VERTICAL TYPE ANTIFRICTION BEARING DEVICE

[75] Inventors: Seiichi Kurita, Takahagi; Toru Nakayama, Hitachi; Kinpei Okano, Hitachi; Seishi Watahiki, Hitachi, all of Japan

[73] Assignee: Hitachi, Ltd., Japan

[21] Appl. No.: 568,198

[22] Filed: Apr. 15, 1975

[30] Foreign Application Priority Data

Apr. 26, 1974   Japan .................................. 49-46539

[51] Int. Cl.² .......................... B61F 17/22; F16C 1/24
[52] U.S. Cl. .................................. 308/187; 308/134.1
[58] Field of Search ...................... 308/227, 187, 134.1

[56] References Cited
U.S. PATENT DOCUMENTS

2,680,495   6/1954   Birkigt ............................... 308/134.1
3,318,644   5/1967   Johnson ............................. 308/134.1

Primary Examiner—Philip Goodman
Assistant Examiner—Richard A. Bertsch
Attorney, Agent, or Firm—Craig & Antonelli

[57] ABSTRACT

A vertical type antifriction bearing device which includes an antifriction bearing using balls or rollers as rolling members. This bearing device features that, during operation, the level of lubricating oil is maintained below the antifriction bearing allowing the feed of lubricating oil to the antifriction bearing in a suitable amount, and that during the stoppage of operation, the level of the lubricating oil is raised above the antifriction bearing, whereby during the stoppage of operation the antifriction bearing is shielded from atmosphere or moisture to prevent the corrosion thereof and, during the operation, the agitation loss caused by the lubricating oil is minimized.

16 Claims, 7 Drawing Figures

VERTICAL TYPE ANTIFRICTION BEARING DEVICE

This invention relates to a vertical type antifriction or ball-and-roller bearing device which is usable for a vertical type rotary machine or device such as an electric motor for use with a pump, and more particularly to a vertical type antifriction bearing device of an oil-bath lubricating system, in which lubrication and cooling are attended upon by lubricating oil.

Hitherto, a prior art vertical type antifriction bearing device of an oil-bath lubricating system is of such an arrangement shown in FIG. 1. In this device, a shaft collar 3 having a 'L' shaped cross section and hence having a skirt portion is secured to a vertical rotary shaft 2, while the inner ring of an antifriction bearing 1 is supported on the outer circumference of the shaft collar 3, with an outer ring being supported by a bearing housing 5 mounted on a stationary member or a bracket 7. Furthermore, the antifriction bearing 1, part of the collar 3 and bearing housing 5 are located in an oil bath 4, in which is fully filled lubricating oil. The oil bath 4 consists of inner and outer peripheral walls and a bottom plate, and is supported on the bracket 7. Shown at 6 is a cover or lid which prevents the scattering of lubricating oil due to the agitation caused by the antifrication bearing 1 and the shaft collar 3, during operation.

With the bearing device of such an arrangement, the level OL of lubricating oil is located above the antifriction bearing 1. The antifriction bearing 1 is rotated in the lubricating oil, whereby it is lubricated and cooled with the lubricating oil.

As is the case with a sliding bearing device, the antifriction bearing device of an oil-bath lubricating system suffers from friction loss and agitation loss. The friction loss, however can not be avoided due to the nature of bearings. In contrast thereto, the agitation loss caused by the rotation of rotating members in the lubricating oil, for instance, by the rotation of rolling members of rolling-member holding means, depends on the amount of the lubricating oil so that the agitation loss may possibly be reduced by improving an oil feed mechanism. The loss due to the agitation of lubricating oil largely depends on the type of the oil-lubricating mechanism. Accordingly, there have been proposed many attempts to reduce the agitation loss, such as for instance, by providing an oil-dropping lubricating system which feeds lubricating oil to a bearing dropwise in the possible minimum amount, or an oil spraying lubricating system which sprays oil to a bearing.

However, the oil dropping lubricating system dictates the use of an oil tub for the oil to be dropped in a suitable amount and a collecting device to collect the lubricating oil which has completed cooling and lubrication for the bearing. Particularly, in the case of a long term operation, maintenance should be given such as by supplying lubricating oil periodically, thus increasing man hours for such an unwanted operation.

On the other hand, the oil spraying lubricating system requires oil spraying means, a pump and piping for connecting the spraying means and the pump together, in order to spray the oil to the bearing, and the above system further requires a cover for preventing the sprayed lubricating oil from scattering and a collecting means for collecting the lubricating oil, thus bringing about complication in its construction.

It follows from this that the oil-bath lubricating system is considered to be most advantageous at the present time from viewpoints of construction and maintenance. However, as has been described earlier, the oil-bath lubricating system presents an extremely large agitation loss which amounts to half the total loss incurred to the bearing.

In addition, the bearing device of this type suffers from another shortcoming such as the failure of applying the same to a high speed rotating machine, because of its limited R.P.M. and the limited diameter of a rotary shaft, which accrue from the temperature rise caused by the bearing loss, in addition to the reason for the aforesaid agitation loss. It is imperative however to cool lubricating oil and bearing itself for remedying the limitation due to the temperature rise of lubricating oil. This in turn dictates to improve heat-exchanging efficiency for achieving the satisfactory cooling for lubricating oil. In the case of a self-cooling bearing device, the greater the difference between the temperature of lubricating oil and the atmospheric temperature, the higher the heat exchanging efficiency. However, if it is used at a high atmospheric temperature, then the cooling efficiency is lowered, with the result of increased temperature in the bearing device. Accordingly, the temperature rise in a bearing should be prevented by minimizing the bearing loss, despite the atmospheric temperature.

The oil-bath lubricating system has advantages that the bearing may be prevented from corrosion because the bearing is maintained immersed in an oil bath, during the stoppage of a rotating machine and during the set-up period of the machine, and thus the bearing may be shielded from exposure to the atmosphere or moisture. In contrast thereto, in case a bearing device of the type, in which oil is supplied from the exterior, is used for an auxiliary pump which is often ceased for a long period of time, as far as the main pump is being operated normally, during such stoppage, the bearing is exposed to atmosphere or moisture and produces corrosion thereon. The pump will fail for starting operation or lead to damage in the bearing itself. To remedy this situation, the bearing should be kept immersed in the lubricating oil.

As a result, the desirable bearing device should meet all of the aforesaid requirements. However, there has been no attempt which can meet the aforesaid requirements entirely.

Now, description will be given in more detail by referring to FIG. 1 showing the most general, vertical antifriction bearing device which is simple in construction and free from corrosion because its antifriction bearing 1 is kept immersed in lubricating oil. However, the immersion of the antifriction bearing 1 in the lubricating oil leads to a considerable agitation loss and a lowered cooling efficiency due to the reluctant flow of lubricating oil, so that the bearing device of such a type may not be applicable to a high speed rotating machine and thus its application may be limited.

In contrast thereto, there has been proposed a bearing device which are shown in FIGS. 2 and 3. In this bearing device of FIG. 2, an oil pump 8 is positioned in the narrowest gap portion between a shaft collar 3 and a bearing housing 5, in an attempt to keep half of the bearing 1 immersed in the lubricating oil having a level OL as shown. In the device of FIG. 3, the antifriction bearing 1 is immersed in the lubricating oil due to the operation of the pump 8 during the operation of the bearing device, while at the time of stoppage, the level of the lubricating oil is kept below the bearing 1.

However, such bearing devices suffer from a corrosion problem, because the antifriction bearing 1 is exposed to atmosphere during the stoppage of the machine, or it poses a problem of increased agitation loss due to the immersion of the rotary shaft 1 in the lubricating oil which is subjected to a forced flow, as shown in the arrow direction, under the action of an oil pump during operation of the machine. However, there results an advantage that, due to the forced flow of lubricating oil, the heat-exchanging efficiency is enhanced and hence such a bearing device is well adapted for use as a high speed, large diameter bearing device.

As is apparent from the foregoing description, with the vertical type antifriction bearing device of an oil-bath lubricating system, an attempt to solve the corrosion problem necessarily leads to the increase in agitation loss and lowering the heat-exchanging efficiency, with the accompanying poor adaptability for a high speed machine. On the other hand, an attempt to solve the problems such as the undesirable use for a high speed machine and the lowered heat-exchanging efficiency will be confronted by the problems of corrosion and increasing agitation loss.

It is an object of the present invention to provide a vertical type antifriction bearing device which presents a minimized agitation loss.

It is another object of the present invention to provide a vertical type antifriction bearing device which is free from corrosion even during the stoppage of a machine for a long period of time.

It is a further object of the present invention to provide a vertical type antifriction bearing device which presents improved heat-exchanging efficiency.

According to the present invention, there is provided for achieving the aforesaid purposes a vertical type antifriction bearing device which includes: an antifriction bearing located between a vertical rotary member and a stationary member; oil-tub housing the antifriction bearing therein, with the lubricating oil being filled therein; and pumping means which maintains the level of lubricating oil below the antifriction bearing during the operation of a machine, while the level of the lubricating oil is so designed as to rise above the aforesaid antifriction bearing, during the stoppage of operation.

More particularly, during the stoppage of operation, the level of lubricating oil is maintained above the antifriction bearing to shield the bearing from the contact with harmful gases such as atmosphere or moisture, while during operation the level of the lubricating oil is maintained below the antifriction bearing by means of a pump for minimizing the agitation loss as well as improving the heat-exchanging efficiency, with the lubricating oil being subjected to forced-circulation.

DESCRIPTION OF THE PREFERRED EMBODIMENTS

Figure 4:
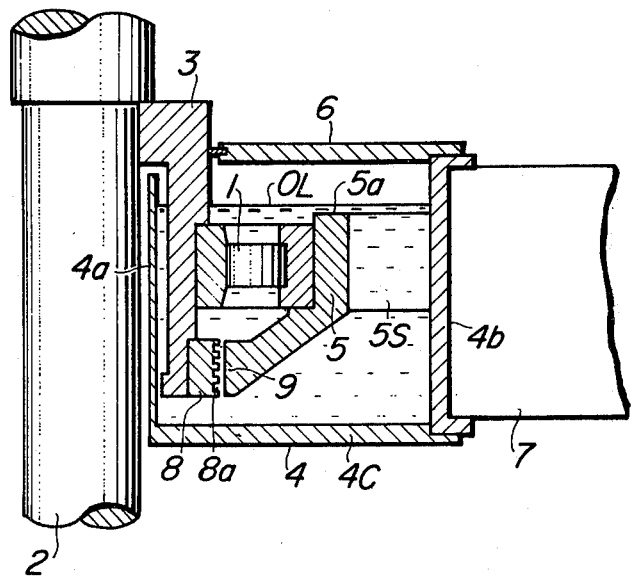
FIGS. 4 and 5 are partial cross sectional views showing vertical type antifriction bearing devices according to the present invention.

Description will be given of the embodiments of the present invention by referring to FIGS. 4 and 5. A shaft collar 3 having a 'L' shaped cross section is secured to a rotary shaft 2 disposed vertically, with the inner ring of a roller bearing 1 or an antifriction bearing fitted on the outer periphery of the shaft collar 3. On the other hand, the outer ring of the roller bearing 1 is secured to an annular bearing housing 5 which is supported through the medium of a supporting arm 5S to an oil container or tub 4. The oil tub 4 consists of an inner peripheral wall 4a, an outer peripheral wall 4b and a bottom plate 4c, thus providing a 'U' shaped cross section, while the inner peripheral wall 4a is positioned in a space defined between the rotary shaft 2 and the shaft collar 3, so that the oil tub 4 houses the shaft collar 3, roller bearing 1 and bearing housing 5 therein. In addition, the oil tub 4 is supported through the medium of an end bracket 7 by a stationary member, with the top opening of the oil tub 4 being closed with a cover 6.

The bearing housing 5 is formed with a peripheral surface 9 which is adjacent to the shaft collar at the lower end of the housing 5, while an annular body 8 is fitted on the lower end portion of the shaft collar 3 at a minute spacing from the peripheral surface 9. There is provided a spiral groove 8a in the peripheral surface of the annular body 8, so that the spiral groove 8a constitutes an oil pump together with the peripheral surface 9 of the bearing housing 5, during operation.

In this bearing device, lubricating oil is filled in the oil tub 4 to a level OL which is positioned above the roller bearing 1. In this condition, the roller bearing 1 is fully immersed in the lubricating oil, so that even during the stoppage of operation for a long period of time, the roller bearing 1 is kept shielded from the atmposphere and moisture by the medium of the lubricating oil.

Figure 5:
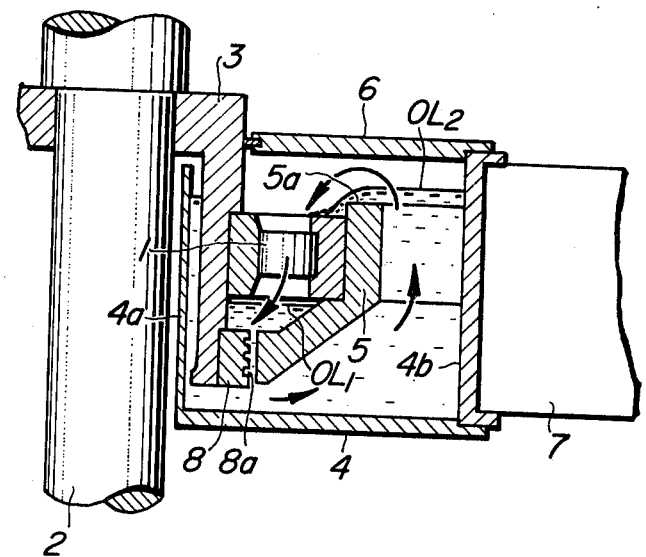

In operation, the lubricating oil flows in a manner as shown in FIG. 5. In other words, if the direction of the spiral groove 8a coincides with the rotating direction of the rotary shaft 2, for instance, in case the right-handed thread is provided for the spiral groove 8a and the rotary shaft rotates in right-handed direction, then there may be achieved a downwardly-acting pumping action. As a result, during the operation, the level $OL_1$ of the lubricating oil inside the housing 5, which has been positioned above the roller bearing 1, is lowered to the lowermost end of the shaft collar 3 or bearing housing 5, thereby exposing the roller bearing 1 completely. At this time, the volume of the lubricating oil outside the outer peripheral surface of the bearing housing 5 is increased by an amount corresponding to the amount of lubricating oil whose level has been lowered, so that the level $OL_2$ of the lubricating oil is raised. Furthermore, due to the rise in the level $OL_2$ of lubricating oil, the lubricating oil overflows the top surface of a dam 5a i.e., the top of the wall of the housing 5 to be introduced into the roller bearing for lubrication and cooling therefor.

Meanwhile, the lowering rate of the level $OL_1$ of lubricating oil confined between the shaft collar 3 and the bearing housing 5 as well as the rising rate of the level $OL_2$ of lubricating oil outside the outer peripheral surface of the bearing housing 5 are both dependent on the diameters of shaft collar 3, bearing housing 5 and outer peripheral wall 4b of the oil tube 4. Thus, the height of the dam 5a is determined according to the relationship between the lowering rate and the rising rate of the lubricating oil, so that the amount of the lubricating oil overflowing the dam 5a into the roller bearing 1 may be determined.

In addition, if the operation is stopped, then the pumping action is interrupted, so that the level of the lubricating oil inwards the bearing housing 5 is raised to flush with the level of the lubricating oil outside the bearing housing 5, thereby maintaining the roller bearing 1 immersed in the lubricating oil.

As is apparent from the foregoing, the roller bearing 1 is maintained above the level of the lubricating oil during operation, so that there remains agitation loss only due to the lubricating oil overflowing the dam 5a. In addition, the lubricating oil which has overflowed the dam 5a to be introduced into the roller bearing 1 for lubrication and cooling will not dwell within the roller bearing 1 but drop therefrom downwardly, so that the agitation loss due to the overflowing lubricating oil may be minimized.

In addition, since the lubricating oil is forcibly circulated in an arrow direction by means of an oil pump provided on the lower end portion of the shaft collar 3, efficient cooling for the roller bearing 1 may result.

Figure 1:
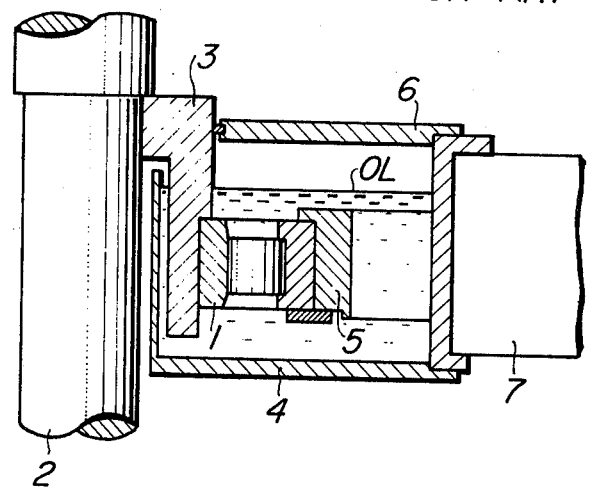
FIGS. 1 through 3 are partial cross-sectional views of prior art, vertical type antifriction bearing devices, respectively.
Figure 2:
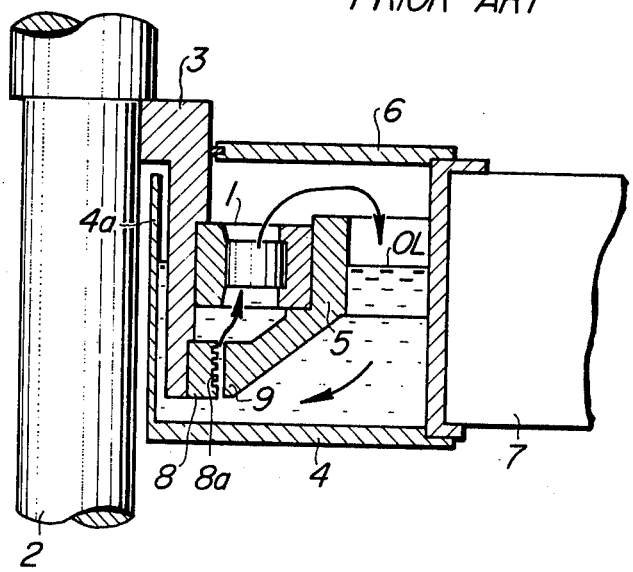
Figure 3:
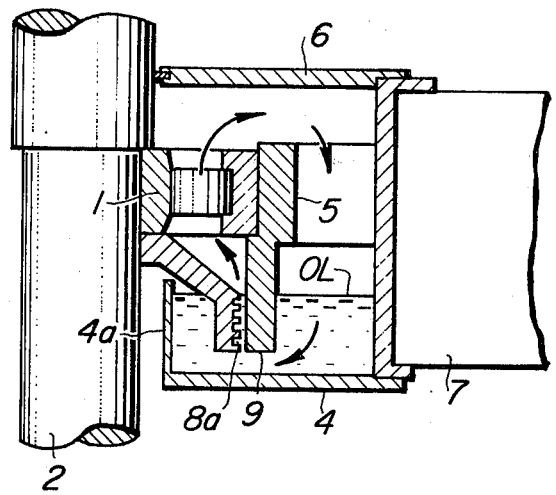

Furthermore, part of the bearing housing 5 is positioned adjacent to the shaft collar 3, and an oil pump is provided in a space so confined therebetween. Thus, the bearing device according to the present invention makes no difference in construction, as compared with those of the prior art, forced-circulating type bearing devices shown in FIGS. 2 and 3.

Figure 6:
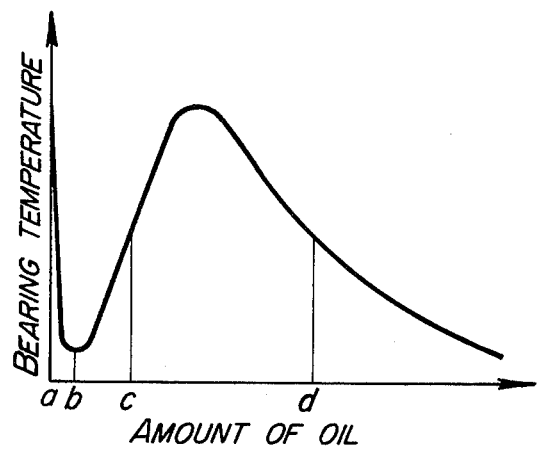
FIG. 6 is a graph illustrating the relationship between the bearing temperature and the amount of lubricating oil.

Meanwhile, the relationship between the bearing loss, particularly, the agitation loss and the bearing temperature depends on the amount of the lubricating oil passing through among the balls or rollers in the anti-friction bearing. This will be described in more detail by referring to FIG. 6 hereunder. The region confined by a–b represents a very small amount of lubricating oil, while the point a represents the absence of lubricating oil. However, the above region is not actually applicable, because of instable lubricating condition and an extremely varying temperature change. The region confined by b–c represents the dropwise feeding of the lubricating oil, illustrating that the agitation loss increases with an increase in the amount of lubricating oil being fed dropwise and that the bearing temperature increases accordingly. The region confined by c–d represents the lubrication of an oil-bath type, presenting the highest bearing temperature. The region confined by d–e represents the lubrication and cooling for a bearing by injecting only the lubricating oil towards the bearing. In this case, the agitation loss will increase due to the increased amount of lubricating oil, while the bearing temperature will be lowered due to efficient cooling.

In summary, the dropwise feeding of the lubricating oil and the spray lubrication are recommendable from viewpoints of lubrication for bearings. However, the spray lubrication system uses an extremely great amount of oil and hence there results complicated oil feeding and collecting devices, so that sizes of the bearing device has to be increased with the additional man hours required for maintenance and checking. Turning to the dropwise feeding system of the lubricating oil, there still remain many problems before adopting the above system. In other words, as has been described earlier, it is imparative that the bearing be shielded from atmosphere and moisture when stopping a machine for a long period of time. However, in the case of the dropwise feeding of lubricating oil, the amount of the oil required for projecting the bearing is not insured, and in addition, the construction is not well adapted for use in protecting the bearing.

It should be noted however that the bearing device according to the present invention incorporates the principle of the dropwise feeding of lubricating oil for lubricating and cooling purposes, while it utilizes the principles of the oil-bath lubricating system for the stoppage of operation.

In passing, it is widely accepted that in the case of oil-bath lubrication system, dmn is 400,000 as a serviceable limitation, wherein dmn represents the value of (the average diameter of the inner and outer diameters of bearing X R.P.M.). In contrast thereto, the bearing device according to the present invention presents dmn = 5 to 600,000 because of the adoption of the dropwise feeding of lubricating oil for operation.

Figure 7:
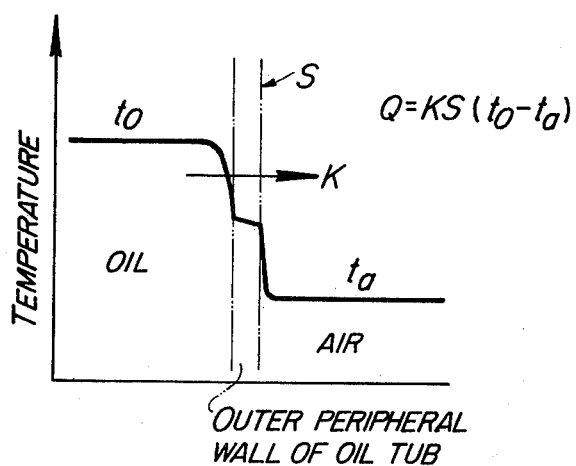
FIG. 7 is a graph indicating the variations in the temperatures of lubricating oil and atmosphere.

Meanwhile, the bearing temperature depends on the heat-exchanging efficiency of lubricating oil, while the heat-exchanging efficiency is governed by the amount of heat dissipated from the oil tub 4 in the case of a natural cooling system. This will be described in more detail by referring to FIG. 7. Assume the temperature ($t_o$) of the lubricating oil, the ambient temperature ($t_a$) of an oil tub, a heat permeating factor K through the outer peripheral wall of the oil tub, and the area (S) of the outer peripheral wall of the oil tub, then the amount (Q) of heat dissipated will be given as follows:

$$Q = K \cdot S (t_o - t_a).$$

In general, the amount of the heat dissipated balances with the bearing loss, so that the increase in the bearing loss leads to an increase in the temperature difference ($t_o - t_a$), thus presenting increased temperature ($t_o$) for the lubricating oil, with the result of an unusable anti-friction bearing. More specifically, assume that the ambient temperature ($t_a$) of the oil tub is 45° C and the allowable temperature ($t_o$) for the lubricating oil is 95° C, and that the natural cooling may be achieved to a level $Q = K \cdot S (95 - 45)$. Then, if the bearing loss is reduced half, the ambient temperature ($t_a$) insuring the allowable temperaure ($t_o$) for the lubricating oil may be obtained as being $t_a = 70°$ C from the formula, $\frac{1}{2} Q = K \cdot S (95 - t_a)$. Stated otherwise, the natural cooling becomes possible even in the high ambient temperature condition of 70° C.

As is apparent from the foregoing description of the bearing device according to the present invention, the level of the lubricating oil is maintained below the anti-friction bearing during operation, and the level of the lubricating oil is so designed as to be positioned above the antifriction bearing at the time of stoppage of operation, for instance, the stoppage of the operation of a rotary machine for a long period of time, so that the antifriction bearing may be protected from the influence of atmosphere and moisture, thus presenting no corrosion problem. In addition, since the antifriction rotates, with a suitable amount of lubricating oil supplied, during the operation, the agitation loss which amounts to over half the bearing loss may be reduced to a great extent, and yet since the lubricating oil is forcibly circulated by means of a pump, the heat-exchanging efficiency may be improved greatly. In addition, the considerable reduction in the bearing loss permits heat-exchange (cooling) at a relatively high ambient temperature.

In addition, a pump is provided by utilizing the part of the constructions of a bearing, such as for instance, by utilizing the parts of the shaft collar or bearing housing for maintaining the level of lubricating oil to a described level, so that the principal construction of the bearing device and those associated therewith may not be modified.

It should be noted however that the discription has been given thus far of the roller bearing device. However, the present invention is by no means limited to this instance but may be applicable to a ball bearing.

What is claimed is:

1. A vertical type antifrication bearing device comprising:
   an antifriction bearing positioned between a vertical rotary member a stationary member;
   an oil tub which houses said antifriction bearing and having lubricating oil filled therein;
   pumping means for maintaining the level of said lubricating oil below said antifriction bearing during operation;
   an oil feeding passage for feeding a desired amount of lubricating oil to said antifriction bearing from above, when the level of the lubricating oil is lowered below said antifriction bearing; and
   an oil return passage for returning the level of the lubricating oil to its initial position which permits the immersion of said antifriction bearing in said lubricating oil, during the stoppage of operation.

2. A vertical antifriction bearing device as set forth in claim 1, wherein said pumping means is formed between said vertical rotary member and said stationary member.

3. A vertical antifriction bearing devince as set forth in claim 2, wherein said pumping means includes a spiral groove formed on at least one of opposed surfaces of said vertical rotary member and said stationary member.

4. A vertical type antifriction bearing device comprising:
   an antifriction bearing positioned between a vertical rotary member and a stationary member;
   an oil tub which houses said antifriction bearing, rotary member and stationary member and which has lubricating oil filled therein;
   an oil passage communicating the spaces above and below said antifriction bearing with each other, said spaces being positioned outside the outer peripheral portion of said bearing; and
   pumping means provided in said oil passage; said pumping means being adapted to maintain the level of the lubricating oil below said antifriction bearing and to feed said lubricating oil upwards through said oil passage; and
   an oil return passage for returning the level of said lubricating oil to its initial position so as to permit the immersion of said antifriction bearing in said lubricating oil, during the stoppage of operation.

5. A vertical antifriction bearing device as set forth in claim 4, wherein said pumping means is formed between said vertical rotary member and said stationary member.

6. A vertical antifriction bearing device as set forth in claim 5 wherein said pumping means includes a spiral groove formed on at least one of opposed surfaces of said vertical rotary member and said stationary member.

7. A vertical type antifriction bearing device comprising:
   an antifriction bearing positioned between a vertical rotary member and a stationary member;
   an oil tub which houses said antifriction bearing and has lubricating oil filled therein; and
   pumping means provided between said rotary member and said stationary member and maintaining the level of said lubricating oil below said antifriction bearing during operation;
   whereby the level of said lubricating oil is returned to its initial position so as to permit the immersion of said antifriction bearing in said lubricating oil during the stoppage of operation.

8. A vertical antifriction bearing device as set forth in claim 7, wherein said pumping means includes a spiral groove formed on at least one of opposed surfaces of said vertical rotary member and said stationary member.

9. A vertical type antifriction bearing device comprising:
   a vertical rotary shaft;
   a shaft collar fitted on the peripheral surface of said rotary shaft and having a cylindrical portion concentric with said rotary shaft;
   an antifriction bearing having its inner ring secured to said cylindrical portion of said shaft collar;
   a bearing housing securing the outer ring of said antifriction bearing thereto;
   an oil pump formed between said bearing housing and said cylindrical portion of said shaft collar but below said antifriction bearing, said oil pump having a capability of feeding oil downwards;
   a dam formed on the top surface of said bearing housing and positioned above said antifriction bearing;
   an oil tub which houses said shaft collar, antifriction bearing, bearing housing, oil pump and dam and has lubricating oil filled therein; and
   a supporting arm supporting said bearing housing on said oil tub.

10. A vertical antifriction bearing device as set forth in claim 9, wherein said oil pump includes a spiral groove formed on at least one of opposed surfaces of said cylindrical portion of said shaft collar and said bearing housing.

11. A vertical type antifriction bearing device comprising:
    an antifriction bearing means mounted between a vertical rotary member and a stationary member,
    an oil tub means for housing said antifriction bearing means therein, said oil tub means being filled with a lubricating oil to a lubricating oil level disposed above ~aid antifriction bearing means, and
    means for lowering the lubricating oil level to a level below said antifriction bearing means during an operation of the antifriction bearing device.

12. A vertical type antifriction bearing device as claimed in claim 11, wherein said lowering means is operable in synchronism with a rotation of said vertical rotary member.

13. A vertical type antifriction bearing device comprising:
    an antifriction bearing means mounted between a vertical rotary member and a stationary member,
    an oil tub means for housing said antifriction bearing means therein, said oil tub housing means being filled with a lubricating oil to a lubricating oil level disposed above said antifriction bearing means, means for lowering the level of the lubricating oil to a position below said antifriction bearing means during an operation of the antifriction bearing device, and means for supplying the lubricating oil to said antifriction bearing means from above said bearing means after the level of the lubricating oil has been lowered by said lowering means.

14. A vertical type antifriction bearing device as claimed in claim 13, wherein said supplying means is arranged at said stationary member.

15. A bearing arrangement comprising:

a first member, a second member rotatably mounted relative to at least said first member, means for accommodating at least said bearing means and a supply of lubricant for the bearing means, and means arranged within said accommodating means for controlling a level of the lubricant with respect to the bearing means such that in a first state the bearing means is immersed in the lubricatnt and in a second state the level of the lubricant is maintained below the bearing means with the lubricant being fed to a position above the bearing means.

16. A bearing arrangement according to claim 15, wherein said controlling means includes means provided at said bearing means for feeding the lubricant to the bearing means in a drop-type manner in the second state.

* * * * *